(12) United States Patent
Bartek et al.

(10) Patent No.: US 8,063,258 B2
(45) Date of Patent: Nov. 22, 2011

(54) CATALYTIC HYDROPYROLYSIS OF ORGANOPHILLIC BIOMASS

(75) Inventors: Robert Bartek, Centennial, CO (US); Michael Brady, Studio City, CA (US); Dennis Stamires, Dana Point, CA (US)

(73) Assignee: Kior Inc., Pasadena, TX (US)

( * ) Notice: Subject to any disclaimer, the term of this patent is extended or adjusted under 35 U.S.C. 154(b) by 0 days.

(21) Appl. No.: 12/917,996

(22) Filed: Nov. 2, 2010

(65) Prior Publication Data

US 2011/0099888 A1  May 5, 2011

Related U.S. Application Data

(63) Continuation of application No. PCT/US2010/035940, filed on May 24, 2010.

(60) Provisional application No. 61/220,794, filed on Jun. 26, 2009, provisional application No. 61/180,501, filed on May 22, 2009.

(51) Int. Cl.
*C10L 1/02* (2006.01)

(52) U.S. Cl. ........ 585/240; 585/241; 585/242; 208/142; 208/143; 208/144; 208/145; 208/404; 208/405; 208/415; 208/416; 208/417; 208/418; 208/419; 208/420; 208/421; 208/422; 208/423; 44/605; 44/606

(58) Field of Classification Search .......... 208/142–145, 208/404–405, 415–423; 585/240–242; 44/605–606
See application file for complete search history.

(56) References Cited

U.S. PATENT DOCUMENTS

| 4,342,650 | A | 8/1982 | Erickson et al. |
|---|---|---|---|
| 4,589,927 | A | 5/1986 | Allen et al. |
| 4,999,328 | A | 3/1991 | Jain et al. |
| 2008/0022595 | A1 | 1/2008 | Lemaire et al. |
| 2008/0076945 | A1 | 3/2008 | Marker et al. |
| 2008/0149896 | A1 | 6/2008 | Lenglet |
| 2009/0084666 | A1 | 4/2009 | Agrawal et al. |
| 2009/0090046 | A1 | 4/2009 | O'Connor et al. |
| 2009/0227823 | A1 | 9/2009 | Huber et al. |
| 2009/0308787 | A1 | 12/2009 | O'Connor et al. |
| 2010/0113849 | A1 | 5/2010 | Bartek et al. |
| 2010/0187162 | A1 | 7/2010 | O'Connor et al. |
| 2010/0204378 | A1 | 8/2010 | O'Connor |
| 2010/0205858 | A1 | 8/2010 | O'Connor |
| 2011/0094147 | A1 | 4/2011 | Bartek et al. |
| 2011/0114765 | A1 | 5/2011 | Brady et al. |
| 2011/0114876 | A1 | 5/2011 | Brady et al. |

FOREIGN PATENT DOCUMENTS

| EP | 1889870 | 2/2008 |
|---|---|---|
| EP | 2105456 | 9/2009 |
| EP | 2107100 | 10/2009 |
| WO | WO 2010/002792 | 1/2010 |
| WO | WO 2010/068773 | 6/2010 |
| WO | WO 2010/071677 | 6/2010 |
| WO | WO 2010/075405 | 7/2010 |
| WO | WO 2010/111396 | 9/2010 |
| WO | WO 2010/135734 | 11/2010 |

OTHER PUBLICATIONS

Bridgewater, A., "Principles and practice of biomass fast pyrolysis processes for liquids," Journal of Analytical and Applied Physics, 51:3-22, (Jul. 1999).
Bridgewater, A., "Fast pyrolysis processes for biomass," Renewable and Sustainable Energy Reviews, 4:1-73, (2000).
Huber, G., et al., "Synthesis of transportation fuels from biomass: chemistry, catalysts and engineering," Chem. Rev., 106(9):(55 pages), (Sep. 2006).
Lappas, A., et al., "Biomass pyrolysis in a circulating fluid bed reactor for the production of fuels and chemicals," Fuel IPC Science and Technology Press, 81(16):2087-2095, (Nov. 1, 2002).
Mckendry, P., "Energy production from biomass (part 1): overview of biomass," Bioresource Technology, 83(1):37-46, (May 2002).
Rocha, et al., "Hydropyrolysis: a versatile technique for solid fuel liquefaction, sulphur speciation and biomarker release," Journal of Analytical and Applied Pyrolysis, 40-41:91-103, (May 1997).
Rocha, et al., "The Scope for Generating Bio-Oils with Relatively Low Oxygen Contents Via HydroPyrolysis," Organic Geochemistry, 30(12):1527-34 (Dec. 1999).
Wyman, et al., "Coordinated development of leading biomass pretreatment technologies," Bioresource Technology, 96(18):1959-1966, (Dec. 2005).
International Search Report for International Application No. PCT/US2010/035940, mailed Jul. 13, 2010.

*Primary Examiner* — Robert J Hill, Jr.
*Assistant Examiner* — Brian McCaig

(57) ABSTRACT

A process for producing fuel from biomass is disclosed herein. The process includes torrefying biomass material at a temperature between 80° C. and 300° C. to form particulated biomass having a mean average particle size from about 1 μm to about 1000 μm. The particulated biomass is mixed with a liquid to form a suspension, wherein the liquid comprises bio-oil, wherein the suspension includes between 1 weight percent to 40 weight percent particulated biomass. The suspension is fed into a hydropyrolysis reactor; and at least a portion of the particulated biomass of the suspension is converted into fuel.

20 Claims, No Drawings

CATALYTIC HYDROPYROLYSIS OF ORGANOPHILLIC BIOMASS

RELATED APPLICATIONS

This application is a continuation-in-part of International Application No. PCT/US2010/35940, filed on May 24, 2010, which claims the benefit of U.S. Provisional Application No. 61/180,501, filed on May 22, 2009 and of U.S. Provisional Application No. 61/220,794, filed Jun. 26, 2009, the entirety of each of the foregoing applications is hereby incorporated herein by reference.

FIELD OF THE INVENTION

This disclosure relates generally to a process for producing fuel from biomass.

BACKGROUND OF THE INVENTION

Biomass, in particular biomass of plant origin, is recognized as an abundant potential source of fuels and specialty chemicals. See, for example, "Energy production from biomass," by P. McKendry—Bioresource Technology 83 (2002) p 37-46 and "Coordinated development of leading biomass pretreatment technologies" by Wyman et al., Bioresource Technology 96 (2005) 1959-1966. Refined biomass feedstock, such as vegetable oils, starches, and sugars, can be substantially converted to liquid fuels including biodiesel (e.g., methyl or ethyl esters of fatty acids) and ethanol. However, using refined biomass feedstock for fuels and specialty chemicals can divert food sources from animal and human consumption, raising financial and ethical issues.

Alternatively, inedible biomass can be used to produce liquid fuels and specialty chemicals. Examples of inedible biomass include agricultural waste (such as bagasse, straw, corn stover, corn husks, and the like) and specifically grown energy crops (like switch grass and saw grass). Other examples include trees, forestry waste, such as wood chips and saw dust from logging operations, or waste from paper and/or paper mills. In addition, aquacultural sources of biomass, such as algae, are also potential feedstocks for producing fuels and chemicals. Inedible biomass generally includes three main components: lignin, amorphous hemi-cellulose, and crystalline cellulose. Certain components (e.g., lignin) can reduce the chemical and physical accessibility of the biomass, which can reduce the susceptibility to chemical and/or enzymatic conversion.

Attempts to produce fuels and specialty chemicals from biomass can result in low value products (e.g., unsaturated, oxygen containing, and/or annular hydrocarbons). Although such low value products can be upgraded into higher value products (e.g., conventional gasoline, jet fuel), upgrading can require specialized and/or costly conversion processes and/or refineries, which are distinct from and incompatible with conventional petroleum-based conversion processes and refineries. Thus, the wide-spread use and implementation of biomass to produce fuels and specialty chemicals faces many challenges because large-scale production facilities are not widely available and can be expensive to build. Furthermore, existing processes can require extreme conditions (e.g., high temperature and/or pressure, expensive process gases such as hydrogen, which increases capital and operating costs), require expensive catalysts, suffer low conversion efficiency (e.g., incomplete conversion or inability to convert lingo-cellulosic and hemi-cellulosic material), and/or suffer poor product selectivity.

To date, a need remains for novel and improved processes for the conversion of solid biomass materials to produce fuels and specialty chemicals.

BRIEF SUMMARY OF THE INVENTION

The invention relates to methods for co-processing a biomass feedstock and a organic liquid solvent (e.g. bio-oils, hydrocarbon liquid or mixture thereof) with or without the presence of hydrogen gas. Some aspects of the invention relates to processing biomass with a hydrogen donor (e.g., refinery feedstock, hydrogen gas or a combination thereof), for example, to convert biomass together with a hydrogen donor into a fuel, specialty chemical, or intermediate product. The invention includes refinery units for co-processing a biomass feedstock and an organic liquid solvent (e.g., with or without the presence of hydrogen gas). The invention also includes methods for co-processing a biomass feedstock and an organic liquid solvent (e.g., with or without the presence of hydrogen gas). By co-processing, the biomass feedstock produces hydrocarbon products that are richer in hydrogen, contain less undesired oxygenic and acidic groups, and fewer undesired aromatic compounds. Accordingly, co-processing can have a synergistic effect of and increase the commercial value and utility of product streams from both feedstocks.

In some embodiments, the process includes torrefying biomass material at a temperature between about 80° C. and about 300° C. to form particulate biomass having a mean average particle size ranging from about 1 µm to about 1000 µm. The particulated biomass may be mixed with an organic liquid solvent to form a suspension, wherein the suspension comprises between about 1 weight percent and about 40 weight percent particulated biomass or alternatively between about 5 weight percent and about 25 weight percent particulated biomass. The suspension is fed into a hydropyrolysis reactor in presence of hydrogen. In some embodiments, the process further comprises recycling hydrogen to the hydropyrolysis reactor. In some embodiments, the process produces a gaseous product comprising a light hydrocarbon portion. The light hydrocarbon portion can be used in a reforming process to produce hydrogen and hydrogen is recycled for use in the hydropyrolysis reactor. In some embodiments, at least a portion of the particulated biomass of the suspension is converted into fuel when subjected to temperature of at least 300° C., and a pressure between about 1 atm to about 200 atm. In some embodiments, the step of torrefying the biomass material is performed at a temperature between about 80° C. and about 200° C., between about 110° C. and about 200° C. or between about 200° C. and about 300° C.

In some embodiments, the organic liquid is a bio-oil, a liquid hydrocarbon or a mixture of bio-oil and liquid hydrocarbon. In some embodiments, the bio-oil is recycled to the organic liquid solvent and mixed with particulated biomass. In some embodiments, the liquid hydrocarbon is obtained from a refinery stream. The liquid hydrocarbon material can be selected from the group consisting of naphtha, gasoil, light cycle oil, heavy cycle oil, atmospheric residuum, vacuum residuum, FCC bottoms, aromatic furfural extract, slurry oil, decant oil, de-asphalted oil, crude oil, atmospheric tower bottoms, atmospheric gas oil, vacuum gas oil, light vacuum gas oil, heavy vacuum gas oil, clarified slurry oil, hydrotreated vacuum gas oil, hydrotreated de-asphalted oil, coker gas oil, hydrotreated coker gas oil and mixtures thereof.

In some aspects of the invention, the suspension is fed in the hydropyrolysis reactor and at least a portion of the particulated biomass is converted into fuel at a temperature of at least about 500° C. In some embodiments, at least a portion of the particulated biomass is converted into fuel at a pressure between about 1 atm and about 35 atm, or between about 1 atm and about 10 atm.

In some embodiments, the suspension is heated, prior to feeding the suspension into the hydropyrolysis reactor, to a temperature between about 300° C. and about 500° C., or between about 380° C. and about 400° C.

In some embodiments, the biomass material is subjected to demineralization prior or after torrefying the biomass material. In some embodiments, following demineralization the biomass material has a mineral content of less than about 2.5 weight percent, less than about 1 weight percent, less than about 0.5 weight percent, based on a total composition of the biomass material. In some embodiments, the step of demineralizing the biomass material comprises soaking the solid biomass material with a solvent, and subsequently removing at least part of the solvent. The solvent can be selected from the group consisting of an aqueous solvent, a mineral acid, an organic acid, an inorganic base. In some embodiments, the solvent is an aqueous acidic solution having a pH of less than about 7 or a pH between 2 and 5. In other embodiments, the solvent is an aqueous basic solution having a pH about 7, or a pH between 8 and 10.

In some embodiments, the biomass is pretreated in presence of molten salts to remove lignin from cellulose. In some embodiments, the pretreatment is performed before the torrefaction step.

In some embodiments, the suspension is contacted with a heat-carrier material in the hydropyrolysis reactor. The heat-carrier material can be an inert material. In some embodiments, the heat carrier further comprises a catalyst, the catalyst having a material selected from the group consisting of synthetic hydrotalcite or a calcinated synthetic hydrotalcite, a synthetic hydrotalcite-like material or a calcinated synthetic hydrotalcite-like material, a layered hydroxy salt or a calcinated layered hydroxy salt and mixtures thereof. In some embodiments, the heat carrier material comprises a catalyst, the catalyst having a material selected from the group consisting of a zeolite, modified zeolites, ion-exchanged zeolites, dealuminated zeolites, ultrastable zeolites, ZSM-5, zeolite-Y, modified forms of ZSM-5 and zeolite-Y, and combinations thereof In other embodiments, the catalyst material is selected from the group consisting of kaolin or calcinated kaolin or combinations thereof In other embodiments, the heat carrier material comprises a catalyst, the catalyst having a material selected from the group consisting of a mixed metal oxide or a calcinated mixed metal oxide, alumina, a supported noble metal, a transition metal and mixtures thereof. The metal oxide is selected from the group of alumina, zirconia, silica, silica-alumina, titiania, and combinations thereof. In some embodiments, the catalyst comprises a metal selected from the group consisting of Co, Mo, Ni, W and combinations thereof.

While the fuels and methods thereof will be described in connection with various preferred illustrative embodiments, it will be understood that it is not intended to limit the fuels and methods thereof to those embodiments. On the contrary, it is intended to cover all alternatives, modifications, and equivalents as may be included within the spirit and scope of the invention as defined by the appended claims.

DETAILED DESCRIPTION OF THE INVENTION

The invention disclosed herein relates to a process for producing fuel from biomass. Suitable biomasses, or biomass materials, can include any biological material derived from living, or previously living, organisms. In more particularity, non-limiting examples of biomasses suitable for use in the process described herein can include inedible materials, which do not compete with the food supply as well as materials that can be easily grown, or materials that are otherwise readily available, such as: grasses (including, for example, switch grass), saw dust, wood chips, wood bark, twigs, straw, corn stover, cotton linters, bagasse, and the like. In various embodiments, biomass materials include materials of photosynthetic origin (e.g., plants), having such as, for example, materials made predominately of cellulose, hemicellulose, or lignin.

Aspects of the invention relate to a process for organophilizing a particulated solid biomass material. The process may include pretreating the biomass material such that the biomass material is physically compatible with a liquid, the liquid comprising bio-oil (the liquid and bio-oil are described in greater detail below). By "physical compatibility" it is meant that the solid biomass material may be efficiently carried by the liquid. Reducing the particle size of the biomass material to a sufficiently small size permits the biomass material to be evenly distributed in the liquid, and to be mixed, effectively suspended, or actually suspended in the liquid. Reducing the particle size of the biomass material to a sufficiently small size enables the biomass material to be physically compatible with, or otherwise efficiently carried by, the liquid. In some embodiments, torrefying the biomass material makes it more organophilic, i.e., less hydrophilic, and permits the biomass material to be evenly distributed in the liquid, and to be mixed, effectively suspended, or actually suspended in the liquid. Accordingly, torrefying enables the biomass material to be physically compatible with, or otherwise efficiently carried by, the liquid. In other embodiments, a combination of reducing the particle size of the biomass material to sufficiently small size and torrefying the biomass material permits the biomass material to be evenly distributed in the liquid, and to be mixed, effectively suspended, or actually suspended in the liquid, which may enable the biomass material to be physically compatible with, or otherwise efficiently carried by, the liquid.

As used herein the term "suspended" refers to the biomass material being physically compatible with the liquid hydrocarbon, and thus the biomass material may be mixed with the liquid hydrocarbon material or either effectively suspended, or actually suspended within the liquid hydrocarbon material. This step enables the biomass material to be physically compatible with, or otherwise efficiently carried by, the liquid hydrocarbon material. In some embodiments, the preferred particle size to be suspended varies depending on a number of factors, including, the composition of the biomass material, the composition of the liquid hydrocarbon material, the velocity of the liquid hydrocarbon material, the temperature and pressure of the suspension, the material of the conduit (e.g., pipe or tank) holding the suspension, the amount of time the suspension is to remain together, and the like considerations. In one embodiment, the suspension of the biomass material and liquid hydrocarbon material is contained within a pipe at a refinery and the biomass material is considered efficiently carried by the liquid hydrocarbon material so long as the pipe does not substantially plug after continued use.

Pre-Treating Biomass

In some embodiments, the biomass material is pretreated by mechanical processing, such as, for example, shredding, chipping, milling, kneading, grinding, and the like, until the mean average particle size of biomass material—as a whole—ranges from 1 mm to 10 cm, alternatively from 1 cm to 10 cm. For example, prior to the torrefaction, the solid biomass material is mechanically treated to form particles having a mean particle size in the range of from 1 μm to 10 cm. Alternatively, following pretreatment by mechanical processing the mean average particle size of each, individual, biomass material ranges from 1 μm to 10 cm, alternatively from 1 cm to 10 cm.

In some embodiments, the biomass is pretreated to separate the lignin component from the cellulosic component. For example, the cellulose component can be dissolved in presence of lignin and be separated from lignin. In some embodiments, the separation of the lignin from the cellulose can be performed after mechanically treating the biomass. In an exemplary embodiment, the particles of lignocellulosic material can be mixed with a basic solution, an acidic solution a ionic solution or combinations thereof. In some embodiments, the ionic solution comprises hydrated molten salts. Suitable molten salts can include any salt such lithium, magnesium, sodium, copper iron, potassium and zinc chlorates, chlorides, bromides, iodides, nitrates, sulfides, acetates, and isocyanates, having a melting point below about 300° C., or preferably below about 200° C. The cellulosic component can be dissolved by heating the solution, for example at a temperature in the range of about 40° C. to about 200° C. In some embodiments, undissolved components or residues are removed by filtration and the cellulosic components are processed as described below.

Torrefaction

In some aspects of the invention, the torrefaction process is used as a means to prepare the raw biomass before liquefaction conducted in a catalytic cracking reactor unit by converting soft/flexible raw biomass particles to harder/brittle particles, having higher density, which can be more easily ground to small particles, consuming much less mechanical energy; and converting the surface properties of said particles to hydrophobic from hydrophilic. Therefore, the small organophilic (i.e., hydrophobic) particles become more miscible with oil and are suitable to mix with, for example, bio-oils. In some embodiments, the biomass material is subjected to torrefaction to render it more organophilic, i.e., less hydrophilic, and therefore to permit the biomass material to be evenly distributed in the liquid hydrocarbon material, and to be mixed, effectively suspended, or actually suspended in the liquid hydrocarbon material. In some embodiments, an intimate mixture of the biomass material with a particulate inorganic catalyst material is created, preferably, prior to the torrefaction process, when the solid biomass material is still relatively soft. Suitable methods for creating such intimate mixtures include mechanical process, such as milling, grinding, kneading, extruding, and the like.

The torrefaction step enables the biomass material to be physically compatible with, or otherwise efficiently carried by, a liquid solvent such as bio-oil or liquid hydrocarbon material. In some embodiments, the combination of reducing the particle size of the biomass material to a sufficiently small size and torrefying the biomass material permits the biomass material to be evenly distributed in the liquid solvent, and to be mixed, effectively suspended, or actually suspended in the liquid solvent, which may enable the biomass material to be physically compatible with, or otherwise efficiently carried by, the liquid solvent.

In an embodiment, the biomass material may be further pretreated, after mechanical processing, in a torrefaction process at a temperature between 80° C. and 400° C., alternatively between 80° C. and 200° C., alternatively between 110° C. and 200° C., alternatively between 200° C. and 400° C. The term "torrefaction" as used herein refers to a heat treatment of the particulate solid biomass material in an oxygen-poor or a substantially oxygen-free atmosphere. The term "toasting" as used herein refers to heat treatment carried out at temperatures between 80° C. and 300° C., or preferably between 110° C. and 200° C., or more preferably between 105° C. and 140° C. The term "roasting" as used herein refers to heat treatment carried out at temperatures between 300° C. and 400° C. Generally, a biomass material is considered "toasted" when it is torrefied at a temperature between 80° C. and 300° C., and a biomass material is considered "roasted" when it is torrefied at a temperature between 300° C. and 400° C.

In some embodiments, the torrefaction process proceeds under atmospheric conditions, and preferably, the torrefaction process proceeds in an oxygen-poor or substantially oxygen-free environment. For example, the torrefaction is carried under an atmosphere containing less oxygen than does ambient air, containing less than about 22 volume percent oxygen, alternatively less than about 21 volume percent oxygen, alternatively less than about 20 volume percent oxygen, alternatively less than about 15 volume percent oxygen, alternatively less than about 10 volume percent oxygen, and alternatively less than about 5 volume percent oxygen. In an embodiment, the torrefaction process proceeds in the presence of an inert gas, such as for example nitrogen or steam.

Under appropriate conditions, for example under toasting conditions, the moisture will escape from the biomass particles and form a steam blanket around the biomass material, thereby protecting it from atmospheric oxygen. The process is then conducted in a steam atmosphere at ambient pressure or at higher steam pressure. However, in some embodiments, the process is carried out in air, as compared to in an atmosphere that is substantially oxygen-free.

In an embodiment, prior to the torrefaction process, the biomass material is mixed with water, and introduced into a closed vessel, for example an autoclave. The amount of water can range from about 25 weight percent to about 500 weight percent, based on the weight of the dry biomass material. Preferably, the amount of water is in the range of from about 50% to about 300% by weight of the dry biomass. As the temperature increases, the atmosphere surrounding the biomass material is enriched in steam, creating an oxygen-poor atmosphere even though no oxygen escapes from the closed vessel. The torrefaction process can then be carried out under autogenous pressure.

In some embodiments, following the torrefaction process, the pressure is released by opening the vessel, or opening a release valve provided on the vessel. In an embodiment, the pressure of the vessel is released while the biomass material remains at an elevated temperature, for example at or about the torrefaction temperature, which, as described, ranges from about 80° C. to about 400° C. The pressure release causes a rapid evaporation of water absorbed in the biomass material, thereby rupturing the structure of the biomass material and facilitating mechanical processing of the particulated biomass material as well as subsequent conversion reactions.

The biomass material can be torrefied from several seconds to several hours, depending on a number of factors, including without limitation, the initial particle size of the biomass material, the desired particle size of the torrefied biomass material, the initial moisture content of the biomass material, the desired moisture content of the torrefied biomass material, the heating rate, the final desired temperature of the torrefied biomass material, and the like considerations. Generally, the duration temperature is short if the temperature is nearer the upper end of the range, particle size is small, and moisture content is low. By way of non-limiting example, the biomass material can be torrefied at 125° C. for about 25 minutes.

As compared to the biomass starting material, the torrefied material offers several advantages. The torrefied material has a higher density, and greater flowability, making it easier to transport and store. Being more brittle, it is more readily ground to smaller particles. Particles obtained by milling or grinding torrefied material are more round (less needle-like) than particles obtained by grinding un-torrefied biomass material. The torrefied material is generally hydrophobic and, as a result, has greater microbial stability.

One skilled in the art would appreciate that as the torrefaction of the biomass material causes it to become relatively brittle, the amount of energy necessary to reduce the mean average particle size of the biomass material is greatly reduced. In some embodiments, relatively large solid biomass particles are used for the torrefaction, for example in the range of 1 cm to 10 cm. In an embodiment, the mean average particle size of the biomass material—as a whole—following the torrefaction process ranges from 1 μm to 1000 μm, alternatively from 10 μm to 500 μm, alternatively from 10 μm to 200 μm ("particulated biomass"). Alternatively, following the torrefaction process the biomass material may be further mechanically processed by, for example, shredding, chipping, milling, grinding, kneading, and the like, until the mean average particle size of the biomass material—as a whole— ranges from 1 μm to 1000 μm, alternatively from 10 μm to 500 μm, alternatively from 10 μm to 200 μm. In an alternative embodiment, the biomass material is particulated by conveying biomass material in a stream of gas, and forcing the stream, with the biomass material, to collide with a surface, or with particles, of greater hardness than the biomass material. In an embodiment, such a method may be carried out in a tubular device, or in a cyclone.

During torrefaction, gaseous materials and volatile organic compounds are released from the biomass material. Examples include carbon dioxide, acetaldehyde, formaldehyde, acetic acid, formic acid, methanol, carbon monoxide, and methane. It is desirable to capture these materials as they are released from the biomass. In some embodiments, methane and methanol may be used in the process for heating the biomass to the torrefaction temperature. In some embodiments, carbon monoxide may be used in a subsequent catalytic pyrolysis process as a reducing agent. Acetaldehyde, formaldehyde, acetic acid and formic acid are well known building blocks of valuable organic compounds.

In some embodiments, the torrefaction temperature is chosen so as to avoid the formation of significant quantities of organic compounds that are liquid at room temperature, and contain 4 or more carbon atoms. For example, the torrefaction temperature can be at or above 200° C. In some embodiments, the torrefaction temperature varies with the nature of the biomass material (in particular with the amount of ash or minerals present in the biomass material), the presence or absence of catalytic material in the biomass during the torrefaction step, and, if a catalytic material is present, the nature of the catalytic material.

Demineralization

In some embodiments, the biomass material is subjected to a demineralization treatment either prior to or after the torrefaction process. The purpose of such demineralization treatment is the removal of at least part of the inorganic materials as may be naturally present in the biomass material. Many biomass materials contain minerals that are catalytically active, and could interfere with subsequent conversion processes. Depending on its origin, the solid biomass feedstock may contain from 1 weight percent to more than 20 weight percent minerals, generally referred to as "ash". High ash contents are generally undesirable, as they can lead to uncontrolled catalytic reactions during the conversion process. Minerals present in the biomass material may foul refinery equipment, and may even poison catalysts used in refinery processes. Minerals present in the biomass material can also contribute to the hydrophilic nature of the biomass material, in which case their removal contributes to the organophilizing effect of the torrefaction treatment. In some embodiments, the demineralization treatment removes all, or at least part of, the inorganic materials contained within the biomass material.

In some embodiments, the demineralization treatment includes extraction of minerals from the biomass material with an aqueous solvent. Suitable aqueous solvents can include water or aqueous solutions of an acid or a base. Suitable aqueous acidic solutions include, for example and without limitation, a mineral acid including sulfuric acid, nitric acid, and hydrochloric acid, an organic acid including a carboxylic acid such as formic acid, acetic acid, propropionic acid; and the like or mixtures thereof. In an exemplary embodiment, hydrochloric acid is used as it is easily removed from the biomass by heating. Optionally, the aqueous solvent includes a chelant such as, for example and without limitation, citric acid. In some embodiments, the aqueous solvent has a pH of less than about 7, alternatively the aqueous solvent has a pH between 2 to 5. Yet in other embodiments, the aqueous solvent has a pH above about 7, alternatively the aqueous solvent has a pH between 8 and 10. Suitable aqueous basic solution include, for example and without limitation inorganic base such as NaOH.

In some embodiments, the demineralization treatment includes contacting the biomass material with the aqueous solvent, and subsequently removing at least part of the aqueous solvent. In an exemplary embodiment, the demineralization treatment includes swelling the solid biomass material with the aqueous solvent ("swelling"), and subsequently removing at least part of the aqueous solvent by mechanical action ("dewatering"), such as, for example and without limitation, pressing the swollen biomass material in a filter press. In an alternative embodiment, the swelling and dewatering is carried out in a kneader. In various embodiments, the biomass material is swelled and dewatered once, or repeatedly, in order to obtain a biomass material having a suitable mineral content. In an alternative embodiment, the biomass material is swelled and dewatered multiple times, and after the final swelling step, the biomass material—still in its swollen, or substantially swollen, state—may be introduced into the torrefaction process.

Suitable mineral contents include less than about 2.5 weight percent minerals, alternatively less than about 1 weight percent minerals, alternatively less than about 0.5 weight percent minerals, based on the total weight of the biomass material. Obtaining biomass with suitable mineral content can be accomplished by a judicious selection of the solid biomass material, or subjecting the biomass material to a demineralization pretreatment, or both.

Mixing Pre-Treated Biomass with Organic Solvent

In some embodiments, after pre-treating the biomass, the torrefied, particulated biomass material is suspended within the liquid organic solvent. In some embodiments, the liquid solvent is a bio-oil, a mixture of organic and mineral oils, a liquid hydrocarbon or a mixture thereof. In an embodiment, the organic liquid solvent includes pyrolysis oil or bio-oil. In a non-limiting embodiment, bio-oil may include any liquid substance derived from a biomass material, including, without limitation, any combustible, oily liquid substance derived from a biomass material. In some embodiments, the liquid organic solvent is a bio-oil or a mixture of bio-oil and liquid hydrocarbon.

In some embodiments, bio-oils are produced by converting solid biomass into liquid products. The liquid products comprise an aqueous phase and an oil phase. The oil phase is generally referred to as bio-oil. Bio-oils are generally obtained from liquefaction and/or pyrolysis of biomass. For example, during fast pyrolysis, the biomass is heated at temperatures from about 450° C. to about 650° C. in the absence of supplied oxygen. Upon condensation, the vapors condensed to form a liquid bio-oil.

In an embodiment, the liquid hydrocarbon material may be obtained from a refinery stream. The term "refinery stream" may mean any liquid hydrocarbon mixture used as a feedstock in, or produced by, a unit operated in an industrial petroleum refinery. Non-limiting examples of suitable liquid hydrocarbon materials may include: naphtha, gasoil, light cycle oil, heavy cycle oil, atmospheric residuum, vacuum residuum, FCC bottoms, aromatic furfural extract, slurry oil, decant oil, de-asphalted oil, crude oil, atmospheric tower bottoms, atmospheric gas oil, vacuum gas oil, light vacuum gas oil, heavy vacuum gas oil, clarified slurry oil, hydrotreated vacuum gas oil, hydrotreated de-asphalted oil, coker gas oil, hydrotreated coker gas oil, and mixtures thereof.

In an embodiment, the torrefied, particulated biomass material is suspended in the liquid solvent by feeding the torrefied, particulated biomass material and the liquid solvent into a high shear mixer. In preferred embodiments, the particulated biomass material is physically compatible with the liquid organic solvent. In an embodiment, the particulated biomass material and liquid suspension may contain from about 1 weight percent to about 40 weight percent, alternatively from about 5 weight percent to about 25 weight percent, by weight of the suspension, particulated biomass material. In an embodiment, the particulated biomass material may be suspended the liquid to permit processing of the suspension in a refinery unit operation. In various embodiments, the suspension may be continuously agitated. The residence time of the refinery stream in the refinery unit can be very short, for example less than about 5 minutes, alternatively less than about 1 minute, alternatively less than about 30 seconds, alternatively less than about 15 seconds, alternatively less than about 5 seconds, alternatively less than about 1 second.

Hydropyrolysis

Aspects of the invention relates to the process for producing fuel from biomass using hydropyrolysis. Hydropyrolysis is defined herein as pyrolysis in presence of externally supplied hydrogen ($H_2$). In some embodiments, a process of fast pyrolysis or hydropyrolysis is used wherein hydrogen is introduced during the pyrolysis step. In some embodiments, hydrogen needed for the hydropyrolysis is derived from methane, gasification of biomass or refinery feedstocks. In some embodiments, the light portion of the gaseous product is used in reforming process to produce hydrogen that is recycled for use in the hydropyrolysis process. Yet in other embodiments, hydrogen is derived form a carbon-free hydrogen energy source (e.g. water). In some embodiments, the process further comprises recycling residual hydrogen back to the hydropyrolysis reactor.

In some embodiments, the organic solvent-particulated biomass suspension is fed with hydrogen to a processing unit (e.g. hypropyrolysis reactor, hydrocracker). Accordingly, in some embodiments, the bio-oil produced by hydropyrolysis contains more hydrogen atoms and less oxygen atoms as compared to particulated biomass. Yet, in certain embodiments, hydrogen is fed to the organic solvent such as bio-oils. The hydropyrolysis process of the biomass improves the properties of the bio-oil, such as for example producing bio-oil with higher heating value, low viscosity, higher chemical stability, higher energy density, etc. . . . . .

In some embodiments, the hydropyrolysis and hydrodeoxygenation reactions take place in the same reactor. Hydropyrolysis may be performed in presence of a suitable catalyst. In some embodiments, hydropyrolysis is preformed in presence of a hydrodeoxygenation catalyst for facilitating hydropyrolysis and the production of bio-oil with lower oxygen content and higher energy density.

In some embodiments, the bio-oil may be recycled to the organic liquid solvent to be mixed with the particulated biomass material.

In some embodiments, the organic liquid may be preheated up to temperature ranging from about 400° C. to about 600° C. or higher, prior to the introduction of the biomass material into the liquid, and then the suspension may be fed into a unit. This may reduce the amount of time the reactants are exposed to intermediate temperatures (i.e., temperatures between the temperature of the feed and the desired reaction temperature). Prolonged exposure of the reactants to intermediate temperatures may lead to the formation of undesirable products via undesirable decomposition and/or reaction pathways. Alternatively, the particulated biomass material may be introduced to the liquid, without preheating the liquid, and the suspension may be preheated up at temperatures ranging from about 400° C. to about 600° C. or higher, prior to being fed into the unit. In a still further alternative, the particulated biomass material may be preheated to a temperature of about 300° C., or less, prior to being introduced to the liquid, and then the suspension may be preheated at temperatures ranging from about 400° C. to about 600° C. or higher, prior to being fed into the unit.

The reactor(s) may have any suitable size for performing the processes described herein. For example, the reactor may have a volume between 0.1-1 L, 1-50 L, 50-100 L, 100-250 L, 250-500 L, 500-1000 L, 1000-5000 L, 5000-10,000 L, or 10,000-50,000 L.

Without limitation, suitable units may include, for example, a hydropyrolysis reactor. The reactor(s) may be operated at any suitable temperature and pressure conditions. See for instance, Rocha J. D. et al, Organic Geochemistry, Vol. 30, pp 1527-1534 (1999) and Rocha J. D. et al., Journal of Analytical and Applied Pyrolysis, Vol. 40-41, pp 91-03 (1997), which are incorporated herein by reference in their entirety. In some instances, it may be desirable to operate the reactor at relatively high temperatures. For example, the reactor may be operated at temperatures of at least about 300° C., at least about 400° C., at least about 500° C., at least about 600° C., at least about 700° C., at least about 800° C., at least about 900° C., or at least about 1000° C. In some embodiments, the reactor may be operated at temperatures between 500° C. and 1000° C., between 525° C. and 800° C., between 550° C. and 700° C., or between 575° C. and 650° C. In other embodiments, the reactor may be operated between about 500° C. and about 600° C. One would appreciate that hydropyrolysis maximizes liquid hydrocarbon products which is favored by fast heating rate and short residence time in the pyrolysis reactor. Accordingly, in some embodiments the heating rate is from about 5° C./min to about 300° C./min. In some embodiments, the residence time is less than 1 minute, preferably less than 10 seconds, more preferably less than 2 seconds. The reactor(s) may also be operated at any suitable pressure. In some embodiments, the hydropyrolysis reactor may be operated at pressures of between about 1 atm to about 4 atm. In some embodiments, the reactor may be operated at a pressure of at least about 1 atm, at least about 2 atm, at least about 3 atm, or at least about 4 atm. In some embodiments, the reactor operates at a pressure of between about 1 atm to about 200 atm.

In some embodiments, the suspension of particulated biomass material and liquid may introduced with a heat carrier within the unit. The heat carrier may have a temperature ranging of at least 450° C., preferably at least 550° C., more preferably at least 600° C. In an embodiment, the heat carrier may be an inert material, such as, for example, sand. Alternatively, the heat carrier may be, or otherwise contain, a catalyst. Without limitation, suitable catalysts may have widely varying chemical properties, and preferable catalysts may have specific surface areas (as measured by nitrogen adsorption using the BET method) ranging from about 1 $m^2/g$ to about 400 $m^2/g$, alternatively from about 5 to about 100 $m^2/g$, alternatively from about 5 $m^2/g$ to about 50 $m^2/g$.

In some embodiments, the hydrogen is added in presence of a catalyst, for example zeolite catalyst. In some embodiments, hydropyrolysis in presence of zeolite catalyst is carried at temperature less than about 500° C., more preferably less than about 400° C. and most preferably around or below about 350° C.

In some embodiments, the catalytic material is an acidic material. Suitable acidic materials include mineral acids, such as nitric acid, hydrochloric acid, phosphoric acid, and sulfuric acid. Solid acidic materials may also be used, such as ZSM-5, HZSM-5, super acids, transition metal oxides (Al, Ti, Zr, etc) doped with acidic ions (salts), such as sulfates, chlorides, phosphates, etc. In some embodiments, the catalysts comprise a solid acid, such as, for example, a zeolite including ZSM-5 and zeolite-Y.

In other embodiments, the catalyst may comprise a solid base, such as, for example, a hydrotalcite or a calcinated hydrotalcite, a hydrotalcite-like material or a calcinated hydrotalcite-like material, a clay or a calcinated clay, a layered hydroxy salt or a calcinated layered hydroxy salt, a mixed metal oxide or a calcinated mixed metal oxide, or a mixture thereof. For example, basic catalytic materials include alkali metal oxides and hydroxides, alkali metal carbonates, earth alkaline metal oxides and hydroxides, (in particular, NaOH, KOH), earth alkaline metal carbonates (in particular $Na_2CO_3$, and $K_2CO_3$), layered mixed hydroxides, cationic layered materials, hydrotalcite and hydrotalcite-like materials, combinations of an alkali metal carbonate and a hydrotalcite-like material (including hydrotalcite per se), and mixtures thereof. In some embodiments, the catalytic material is a natural clay such as kaolin clay, bentonite or smectite clay. In some embodiments, calcinated products can be used to reduce the coke yield of the conversion of the suspended biomass material into fuel.

In another embodiment, the catalyst comprises an amphoteric material, such as alumina, or a neutral material (such as coke, for example, petroleum coke). Alternatively, the catalyst may be a conventional FCC catalyst, such as, without limitation, vacuum gas oil (VGO) catalyst, or a catalyst having hydrotreatment activity, or hydrogenation activity, wherein the catalyst comprises a metal selected from the group consisting of Co, Mo, Ni, W and combinations thereof, as well as such catalysts in sulfided form, supported noble metal catalysts, and supported transition metal catalysts (for example iron, zinc, copper, nickel, and manganese).

In an embodiment, the particulated biomass material suspended within the liquid may be converted, changed, or otherwise reacted, into fuel within the unit. The conversion, change, or reaction within the unit may be conducted in the presence of molecular hydrogen.

Aspects of the invention includes systems and apparatus for co-processing a biomass feedstock and an organic liquid solvent. A system can include a first feed system and a second feed system, to facilitate co-process a biomass feedstock and a organic liquid solvent or liquid feedstock. The first feed system can provide the liquid feedstock to the refinery unit and the second feed system can provide the solid feedstock to the refinery unit. In embodiments where a biomass feedstock is co-processed with a bio-oil and/or liquid hydrocarbon feedstock, the first feed system can provide the biomass feedstock to the refinery unit and the second feed system can provide the bio-oil and/or liquid hydrocarbon feedstock to the refinery unit. The first feed system can also be adapted to provide a suspension of a solid biomass feedstock in a liquefied biomass feedstock or a refinery/petroleum feedstock (e.g., torrefied biomass particles suspended in a bio-oil). A system can include a third feed system that can provide hydrogen gas to the refinery unit.

Without limitation, the fuel may be used as gasoline, as a feedstock for gasoline blending, as diesel fuel, as a basis for blending a diesel fuel, as jet fuel, as a basis for a jet fuel, as a feedstock for the petrochemical industry, and in connection with other similar uses. These liquid refinery products offer the advantage of a lower carbon footprint, as compared to purely petroleum based refinery liquids, and such fuels may have a higher heating value, as compared to ethanol/gasoline blends, which may result in a variety of benefits, including without limitation, increased gas mileage to the consumer.

The present invention provides among other things methods for converting biomass into fuel and chemicals. While specific embodiments of the subject invention have been discussed, the above specification is illustrative and not restrictive. Many variations of the invention will be come apparent to those skilled in the art upon review of this specification. The full scope of the invention should be determined by reference to the claims, along with their full scope of equivalents, and the specification, along with such variations.

The invention claimed is:

1. A process for producing fuel from biomass comprising:
   (i) torrefying biomass material at a temperature between 80° C. and 300° C., to form particulated biomass having a mean average particle size from about 1 µM to about 1000 µm;
   (ii) mixing the particulated biomass with an organic liquid solvent to form a suspension, wherein the particulated biomass is present in the suspension in an amount between about 1 weight percent to about 40 weight percent, based on the total weight of the suspension;
   (iii) feeding the suspension into a hydropyrolysis reactor;
   (iv) feeding hydrogen into the hydropyrolysis reactor; and
   (v) converting at least a portion of the particulate biomass of the suspension into bio-oil at a temperature of at least 300° C., and a pressure between 1 atm to 200 atm.

2. The process of claim 1 wherein the organic liquid solvent is bio-oil.

3. The process of claim 1, wherein the organic liquid solvent is a mixture of bio-oil and liquid hydrocarbon, wherein the liquid hydrocarbon is obtained from a refinery stream.

4. The process of claim 3, wherein the liquid hydrocarbon material is selected from the group consisting of naphtha, gasoil, light cycle oil, heavy cycle oil, atmospheric residuum, vacuum residuum, FCC bottoms, aromatic furfural extract, slurry oil, decant oil, de-asphalted oil, crude oil, atmospheric tower bottoms, atmospheric gas oil, vacuum gas oil, light vacuum gas oil, heavy vacuum gas oil, clarified slurry oil, hydrotreated vacuum gas oil, hydrotreated de-asphalted oil, coker gas oil, hydrotreated coker gas oil and mixtures thereof.

5. The process of claim 1, further comprising: heating the suspension prior to feeding the suspension into the hydropyrolysis reactor.

6. The process of claim 1, further comprising: demineralizing the biomass material prior to torrefying the biomass material, wherein following demineralization the biomass material has a mineral content of less than about 2.5 weight percent, based on a total composition of the biomass material.

7. The process of claim 6, wherein the step of demineralizing the biomass material further comprises: soaking the solid biomass material with a solvent, and subsequently removing at least part of the solvent, wherein the solvent is selected from the group consisting of: an aqueous solvent, a mineral acid, an organic acid, acetic acid and a carboxylic acid, and wherein the solvent has a pH of less than about 7.

8. The process of claim 6, wherein the step of demineralizing the biomass material further comprises: soaking the solid biomass material with a solvent, and subsequently removing at least part of the solvent, wherein the solvent is an aqueous basic solution and wherein the solvent has a pH above 7.

9. The process of claim 1, further comprising: contacting the suspension with a heat-carrier material in the hydropyrolysis reactor.

10. The process of claim 9, wherein the heat-carrier material is an inert material.

11. The process of claim 9, wherein the heat carrier material further comprises a catalyst, the catalyst having a material selected from the group consisting of synthetic hydrotalcite or a calcinated synthetic hydrotalcite, a synthetic hydrotalcite-like material or a calcinated synthetic hydrotalcite-like material, a layered hydroxy salt or a calcinated layered hydroxy salt and mixtures thereof.

12. The process of claim 9, wherein the heat carrier material further comprises a catalyst, the catalyst having a material selected from the group consisting of a zeolite, modified zeolites, ion-exchanged zeolites, dealuminated zeolites, ultrastable zeolites, ZSM-5, zeolite-Y, modified forms of ZSM-5 and zeolite-Y, and combinations thereof.

13. The process of claim 9, wherein the heat carrier material further comprises a catalyst, the catalyst having a material selected from the group consisting of kaolin or calcinated kaolin or combinations thereof.

14. The process of claim 9, wherein the heat carrier material further comprises a catalyst, the catalyst having a material selected from the group consisting of a mixed metal oxide or a calcinated mixed metal oxide, a supported noble metal, a supported transition metal and mixtures thereof.

15. The process of claim 14 wherein the metal oxide is selected from the group of alumina, zirconia, silica, silica-alumina, titiania, and combinations thereof.

16. The process of claim 14 wherein the catalyst is impregnated with transition metals selected from the group consisting of nickel, cobalt, tungsten, molybdenum and combinations thereof.

17. The process of claim 1, wherein the step (v) of converting is in presence of a catalyst, and wherein the catalyst comprises a metal selected from the group consisting of Co, Mo, Ni, W and combinations thereof.

18. The process of claim 1 wherein the biomass is lignocellulosic biomass and further comprising removing at least a portion of the lignin from the biomass cellulose prior the step (i).

19. The process of claim 1 further comprising recycling hydrogen to the hydropyrolysis reactor.

20. The process of claim 1 wherein the process produces a gaseous product comprising a light hydrocarbon portion and further using the light hydrocarbon portion in a reforming process to produce hydrogen wherein hydrogen is recycled for use in the hydropyrolysis reactor.

* * * * *